(12) United States Patent     (10) Patent No.: US 8,048,547 B2
Ringeisen et al.     (45) Date of Patent: Nov. 1, 2011

(54) BIOLOGICAL FUEL CELLS WITH NANOPOROUS MEMBRANES

(75) Inventors: Bradley R. Ringeisen, Lorton, VA (US); Justin C. Biffinger, Alexandria, VA (US)

(73) Assignee: The United States of America, as represented by the Secretary of the Navy, Washington, DC (US)

( * ) Notice: Subject to any disclaimer, the term of this patent is extended or adjusted under 35 U.S.C. 154(b) by 964 days.

(21) Appl. No.: 11/978,662

(22) Filed: Oct. 30, 2007

(65) Prior Publication Data

US 2009/0169924 A1     Jul. 2, 2009

Related U.S. Application Data

(60) Provisional application No. 60/855,732, filed on Nov. 1, 2006.

(51) Int. Cl.
    *H01M 8/16*     (2006.01)
    *H01M 8/10*     (2006.01)
    *H01M 4/36*     (2006.01)

(52) U.S. Cl. ............ 429/2; 429/401; 429/484; 429/492; 977/948

(58) Field of Classification Search .............. 429/2, 401, 429/484, 492; 977/948
See application file for complete search history.

(56) References Cited

U.S. PATENT DOCUMENTS

| | | | |
|---|---|---|---|
| 3,305,399 A * | 2/1967 | Davis | 429/2 |
| 6,294,281 B1 | 9/2001 | Heller | |
| 6,500,571 B2 | 12/2002 | Liberatore | |
| 6,531,239 B2 | 3/2003 | Heller | |
| 6,551,838 B2 | 4/2003 | Santini, Jr. | |
| 7,160,637 B2 * | 1/2007 | Chiao et al. | 429/2 |
| 7,250,288 B2 * | 7/2007 | Zeikus et al. | 435/287.1 |
| 7,491,453 B2 * | 2/2009 | Logan et al. | 429/2 |
| 2004/0241528 A1 * | 12/2004 | Chiao et al. | 429/43 |
| 2005/0287419 A1 | 12/2005 | Kim | |
| 2006/0019148 A1 | 1/2006 | Tamura | |
| 2006/0024544 A1 | 2/2006 | Nielsen | |

* cited by examiner

*Primary Examiner* — Keith Walker
*Assistant Examiner* — Julian Anthony
(74) *Attorney, Agent, or Firm* — Amy Ressing; Stephen T. Hunnius

(57) ABSTRACT

A fuel cell comprising an anode chamber, a cathode chamber, and a nanoporous membrane between the anode chamber and the cathode chamber, wherein the nanoporous membrane sequesters and isolates a microbe in the anode chamber. The nanoporous membrane allows nutrients to flow actively or passively from the cathode chamber to the anode chamber and can be modified by a thin film composite (TFC) to create a TFC nanofiltration membrane. The nanoporous membrane can have a pore size from about 100 nm to about 1000 nm. A method of making a fuel cell comprising configuring a nanoporous membrane between an anode chamber and a cathode chamber wherein the nanoporous membrane sequesters and isolates a microbe in the anode chamber and can be used to protect the cathode chamber.

18 Claims, 13 Drawing Sheets

Passive (Pump-less) Micro-MFCs
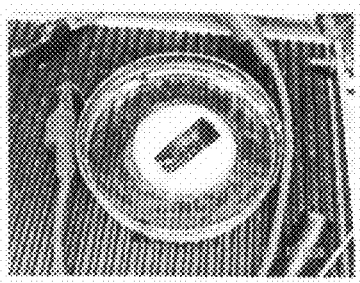
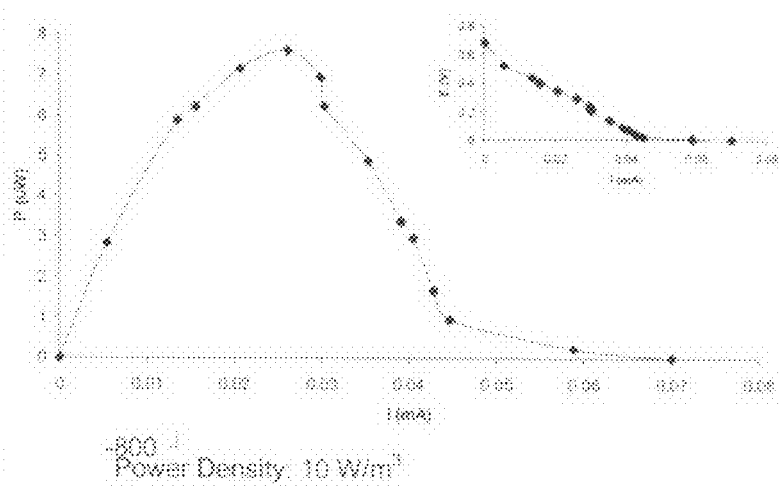
Anode: Graphite Felt (500 μL)
Cathode: Graphite Felt/Pt
Membrane: Nylon 0.2 μm
Surround Electrolyte: MM/5mM Fructose/5mM Lactate
Power Density: 10 W/m³
Figure 16

BIOLOGICAL FUEL CELLS WITH NANOPOROUS MEMBRANES

This application claims the benefit of provisional application No. 60/855,732 filed on Nov. 1, 2006, herein incorporated in its entirety by reference.

Biological fuel cells offer a clean, renewable and potentially autonomous source of energy in the same vein as other environmental power sources such as solar, geothermal, and wind. Biological fuel cells can be separated into two classes. One class is termed enzymatic because they utilize isolated immobilized enzymes to deliver reducing equivalents to the electrode surface but usually require redox mediators to facilitate electron transfer. The second class of biological fuel cells is named microbial fuel cells (MFC). MFCs rely upon the metabolic cycle of living bacteria to generate electrons that are then harvested by the anode and transferred to the cathode where a complementing reduction reaction occurs.

The technology involved in biological fuel cells is scalable (anode, cathode, fluidic chambers, microbe attachment to anode, etc.) but with the exception of fuel cells with a single chamber design, the classic two chamber fuel cells are commonly separated by cation exchange membranes that are expensive (i.e. Nafion® costs about $0.22/cm$^2$) and show long term instability when exposed to high salt concentrations. Unlike regular $H_2/O_2$ proton exchange membrane (PEM) fuel cells where the crossing over of these gases between the anode and cathode chambers would be deleterious to the efficiency of the device, biological fuel cells can be designed where fuel crossover between the chambers would be desirable and this idea can be brought to practice with nanoporous membranes.

As described herein, natural (regenerated cellulose, cellulose nitrate) and synthetic (polycarbonate, nylon) polymeric nanoporous membranes can be used in biological fuel cells and brought to practice a prototype microbial fuel cell that functions in either aerobic or anaerobic environments generating continuous power for weeks on the same magnitude as Nafion®. As described, there can be a potential for decreasing the cost of membranes needed in biological fuel cells and the advancement of using such membranes toward fabricating a device suitable to operate in a real world setting for long periods of time in the water column (i.e., trap electron producing bacteria at the anode, influx of fresh nutrients without the need for pumping, outflow of waste products that could cause apoptosis, protect the cathode from fouling due to bacterial adhesion, etc.).

One of the challenges to designing a microbial fuel cell suitable for long-term operation in aquatic environments can be sequestering the microbe near the anode. It can be shown that nanoporous polymer membranes sequester electron producing microbes while not disrupting fuel cell performance. Many microbial fuel cells avoid this problem by being operated in the anoxic sediment of river beds and oceans. However, the power density generated from these devices are low (26 mW/m$^2$). Furthermore, the potentially low amounts of nutrients in natural environments would most likely lead to biofilm decomposition, making the retention of the bacteria in the anode chamber difficult while operating in the water column. New materials and techniques need to be designed to sequester the bacteria in the anode chamber so that the necessity of creating a stable and resistant biofilm will be circumvented and keep harmful/natural non-electron producing microbes away from anode or cathode that could completely disrupt and destroy power production and the biofilm of the desired electron producing species.

There are important applications, both military and commercial, for biological fuel cells with nanoporous membranes. Specifically, one prerequisite for power generation from a two chamber biological fuel cells is the sequestering and isolation of the biological anode chamber from the environment. The potential ability of MFCs to be miniaturized and their demonstrated capacity to generate continuous power without re-charging (scavenging of environmental nutrients) are a possible solution to the power needs of MEMs and NEMs devices. In addition, MFCs hold the potential to be used as an autonomous power source (i.e., gathering and utilizing nutrients directly from the environment), eliminating the need for human supplied nutrients, fuel, or re-charging. Possible examples of this are MFCs utilizing environmental fuels such as tree sap or carbon sources naturally occurring in soil or aquatic sediments or water columns.

These benefits make miniaturized microbial fuel cells using nanoporous membranes a candidate for important applications such as powering MEMs/NEMs sensor networks for chemical, biological or acoustic stand-off detection and communication because of the overall decrease in cost of the device, eliminate the need to actively flow nutrients through the system because of the power required to operate pumps and ballasts, and increase the stability of the device in salt water, and protect the electrode from bacterial fouling.

BRIEF DESCRIPTION OF THE FIGURES

FIG. 16 illustrates an embodiment and a power curve.

Figure 1:
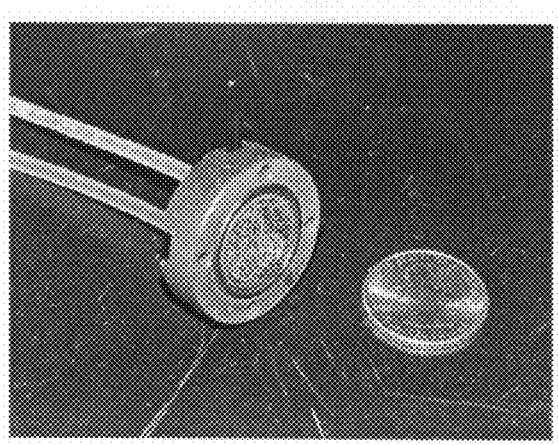
FIG. 1 Mini-MFC chamber with graphite felt electrode.
Figure 2:
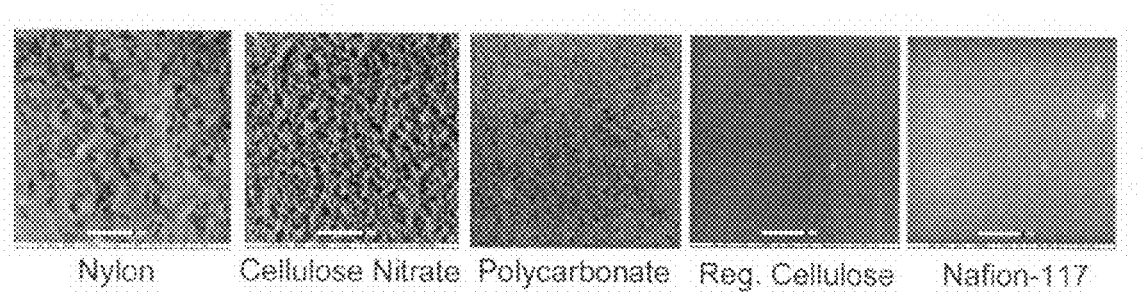
FIG. 2 ESEM of the membranes tested for this invention.
Figure 3:
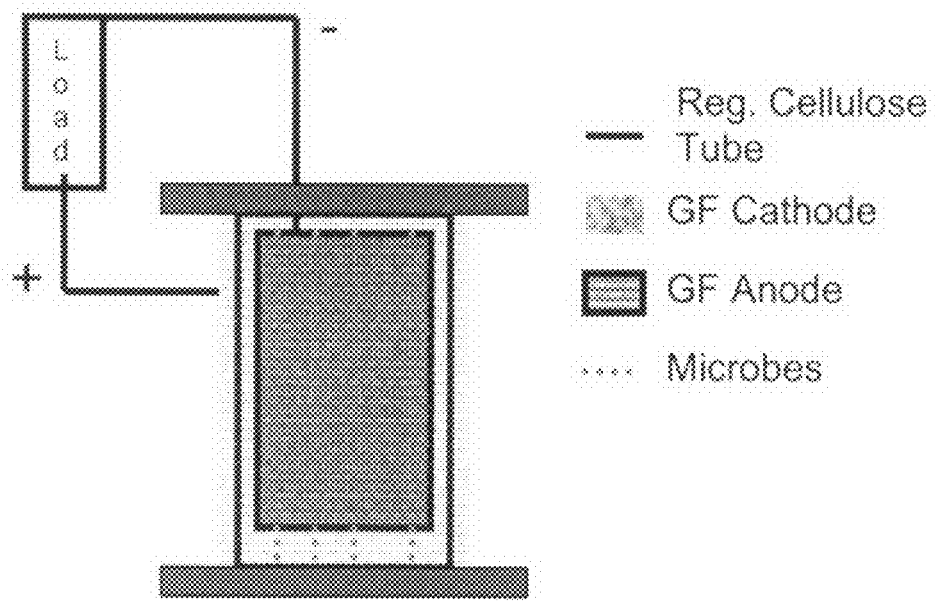
FIG. 3 Schematic representation of the single chamber dialysis bag MFC design.

Described herein is a scalable (micrometer to meter in diameter) electrochemical power generation device based on biological metabolic function that includes at least three features. First, the use of a nanoporous membrane will isolate the anode chamber from the environment which will reduce contamination within the anode chamber and also sequester the metal reducing microbes in the anode which will isolate it from the rest of the cell while allowing the flow of nutrients to diffuse freely between the anode and cathode electrode chambers. This ultimately leads to a design which removes pumping of nutrients into the anode chamber all together hence can reduce the amount of power needed for the operation of the device.

Secondly, as long as the active microbes are localized around the anode it will be shown that all that is required for power production from any biological fuel cell would be any disconnection between the two electrodes by a nanoporous membrane instead of an expensive polymer electrolyte membrane commonly used in biological fuel cells.

Also, the use of a size selective membrane will provide a significant advantage over other microbial fuel cells using Nafion® membranes or no membrane at all by potentially inverting the flow of nutrients through the cathode to the anode which would make a true single chamber device with the cathode acting as a way to scrub oxygen from the aerobic fuel source used by an anoxic anode. Reducing the amount of oxygen in the anode is part of most MFC designs, thus could be used to locally reduce dissolved oxygen prior to nutrient exposure to anode. If microbial fuel cells are to be used in the water column in aquatic environments, the ability to sequester the metal reducing bacteria at the anode can be important considering the likelihood that biofilms formed by bacteria such has Geobacter and Shewanella would likely degrade in an open system located at the water/air interface.

The use of nanoporous membranes in biological fuel cells will lead to inexpensive designs, realistic power generation in real world scenarios, and increased columbic efficiencies without relying on creating stable biofilms on the anodes. On example of a suitable nanoporous membrane is a membrane modified by a thin film composite (TFC) to create a TFC nanofiltration membrane.

There are many applications for sustained underwater surveillance systems (rivers, lakes, littorals). However, there are several challenges to creating a distributed autonomous network of sensors in an aquatic environment. The first difficulty is to attain RF communication either between the sensors or from a sensor to a centralized node. Due to the poor RF propagation underwater, most scenarios involve intermittent surfacing for the purpose of communication. The second challenge is the power source. Batteries may not be an adequate solution due to the remote and corrosive environment they would be in and the long surveillance periods needed. Also, if the sensor functions deep below the surface then enough power must be generated to enable surfacing and submerging of the RF relay.

Biological fuel cells are similar to common hydrogen fuel cells, which produce protons in the anode compartment and pass them through a cation selective membrane (which is insulating so as not to short circuit the fuel cell) to the cathode compartment. The electrons produced from the reduction of the substrate in the anode are connected to the cathode through an external circuit.

The basic design of a macroscopic microbial fuel cell includes the following: (a) an anaerobic anode chamber with a 200-2000 mL that contains a solution of bacteria and possibly electron shuttles/mediators as well as a conductive anode with either enzymes attached or microbial biofilm formation, (b) a cathode chamber with an equal volume that is oxygen rich, contains a conductive cathode, and biocatalysts that promote oxidation reactions, and (c) a proton exchange membrane (PEM), usually Nafion®, that is placed in a channel that separates the anode and cathode chamber.

There are many variations on this devices that include: (a) an air-exposed cathode, (b) a mediator-less anode chamber that utilizes metal reducing bacteria like *Geobacter sulfurreducens*, *Shewanella putrefaciens*, *Shewanella oneidensis*, *Geobacter metallireducens*, and *Rhodoferax ferrireducens*, (c) electrically-conducting polymers coated onto the anode for protection and electron shuttling, (d) Fe and Mn-traced anodes that eliminate the need for solution-bourne electron shuttles, (e) seafloor devices that eliminate the need for the PEM by placing the anode in sediment and the cathode in open ocean water, (f) devices run off of sewage sludge for both delivery of nutrients and bacteria (g) single chamber devices with an air cathode.

Figure 4:
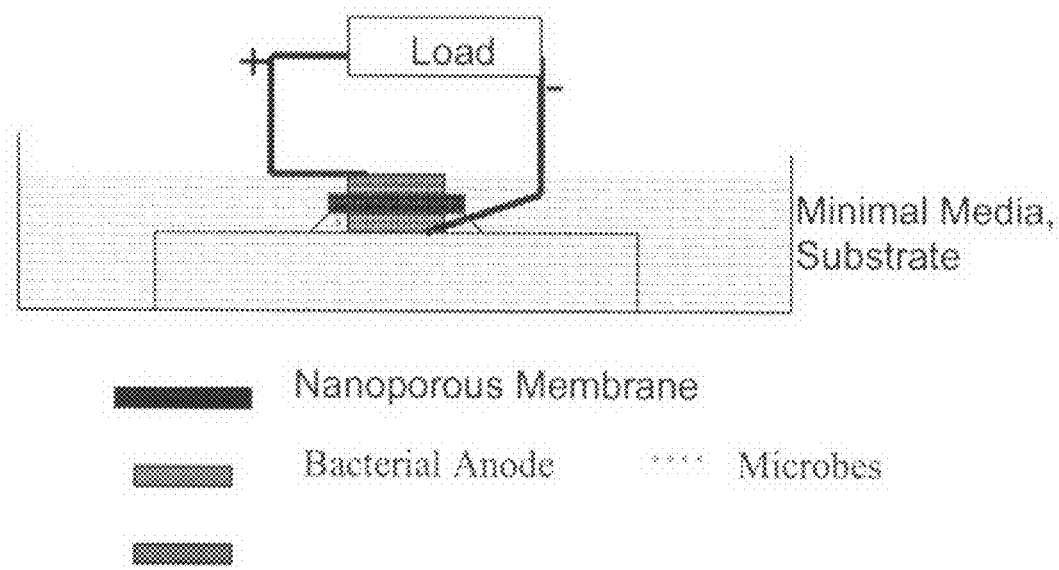
FIG. 4 Design of a micro MFC.
Figure 5:
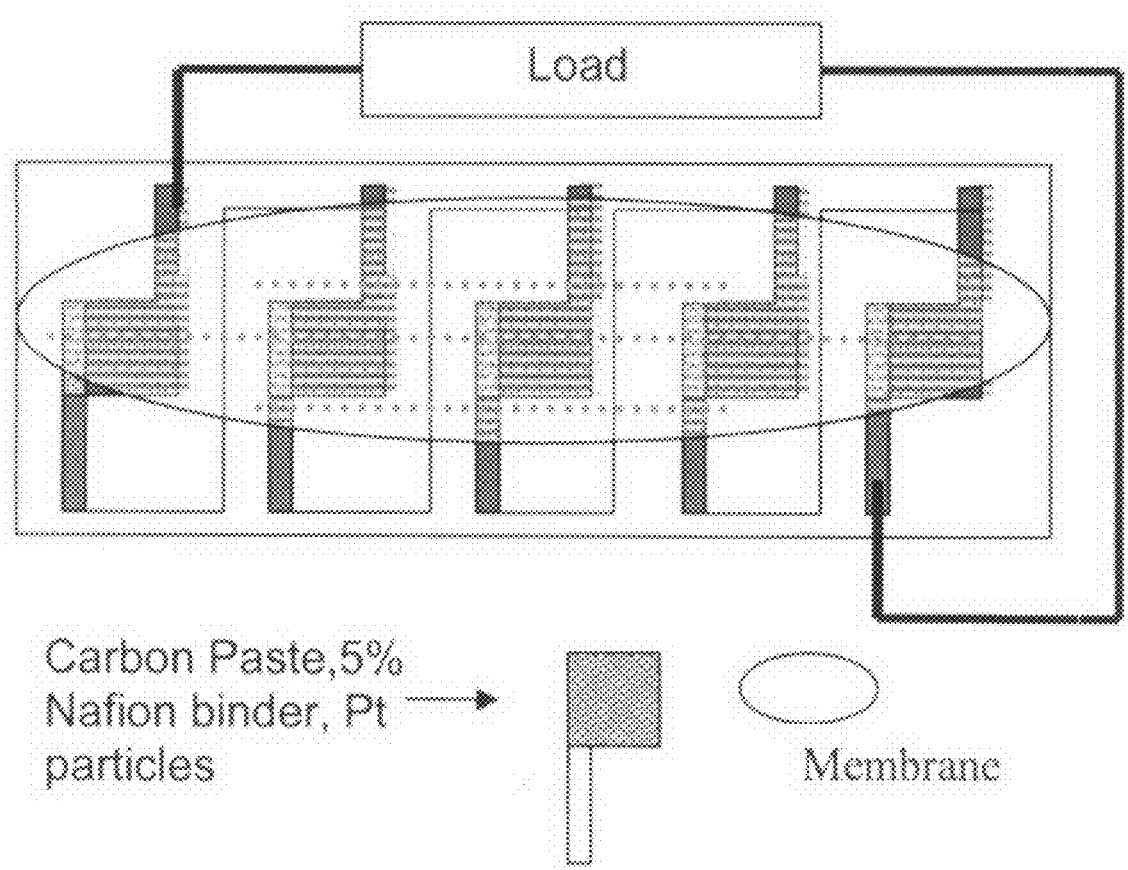
FIG. 5 Stacked design for micro-MFC with nanoporous membrane.
Figure 6:
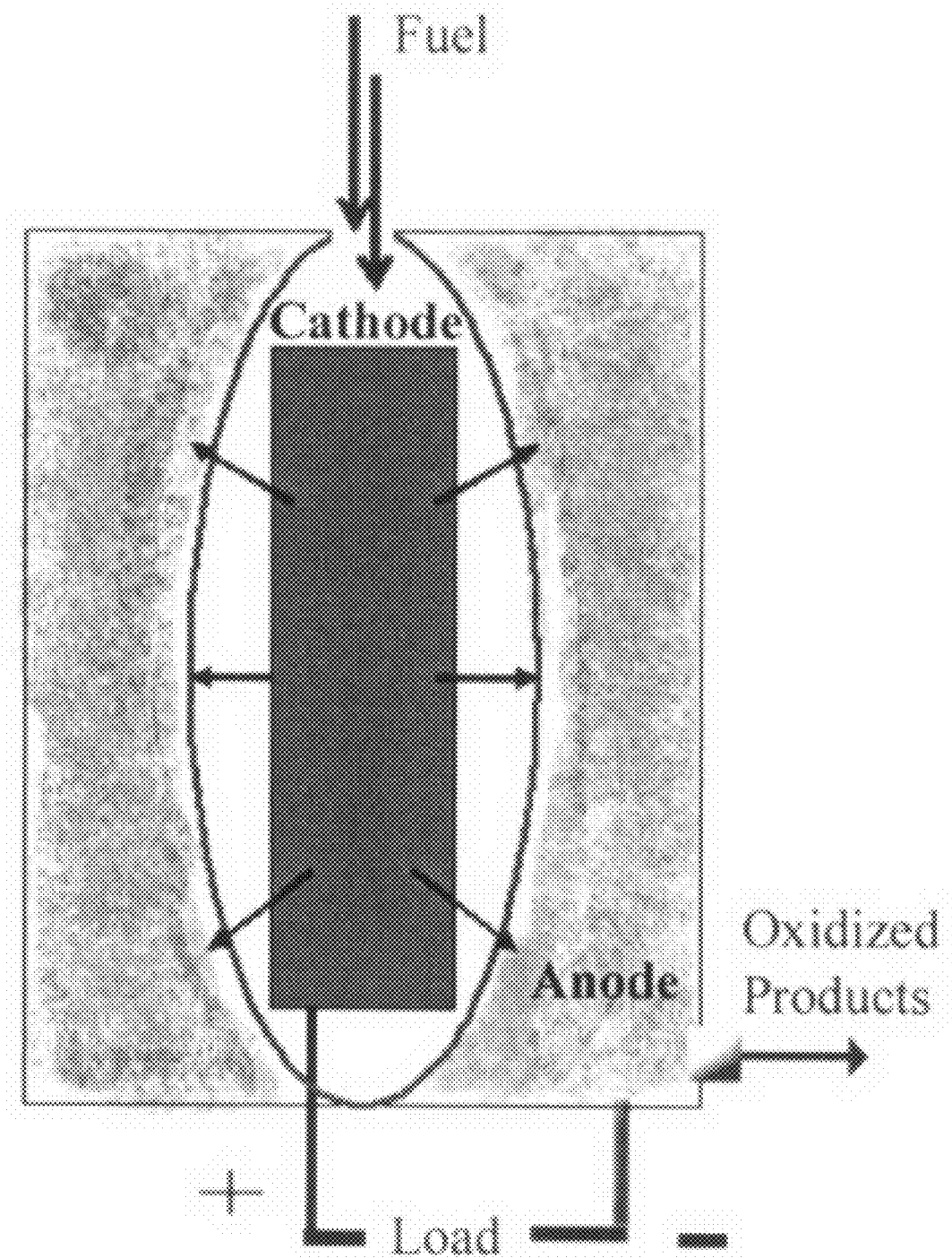
FIG. 6 Design of inverted microbial fuel cell with Nanoporous membrane.
Figure 7:
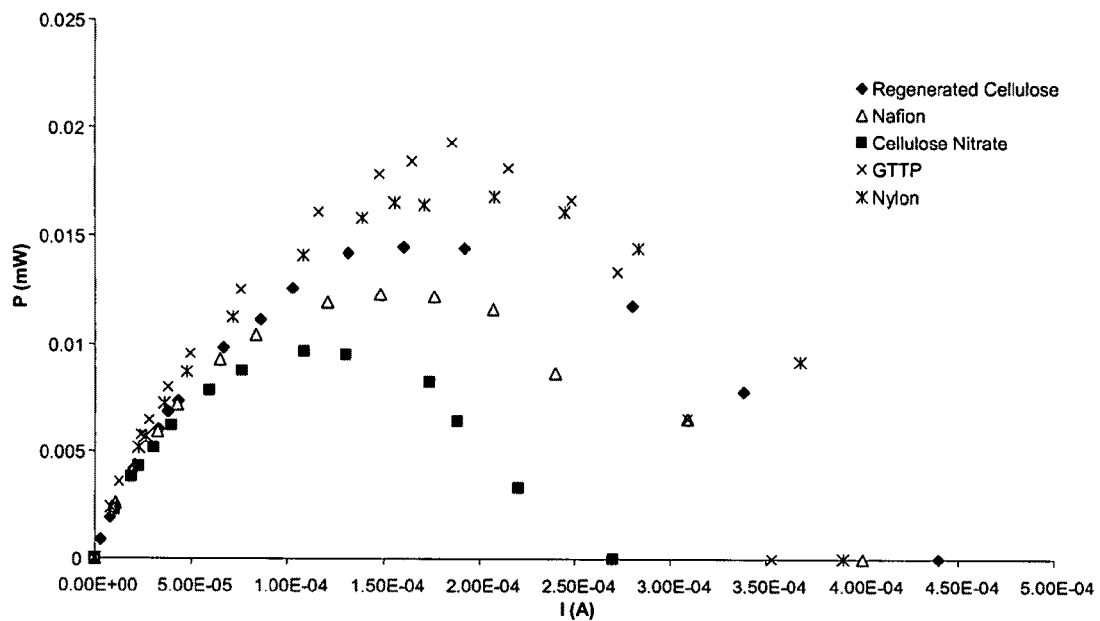
FIG. 7 Power Curve for Graphite Felt (GF)/O$_2$ Cathode in Mini-MFC Setup with an Assortment of Nanoporous Membranes.
Figure 8:
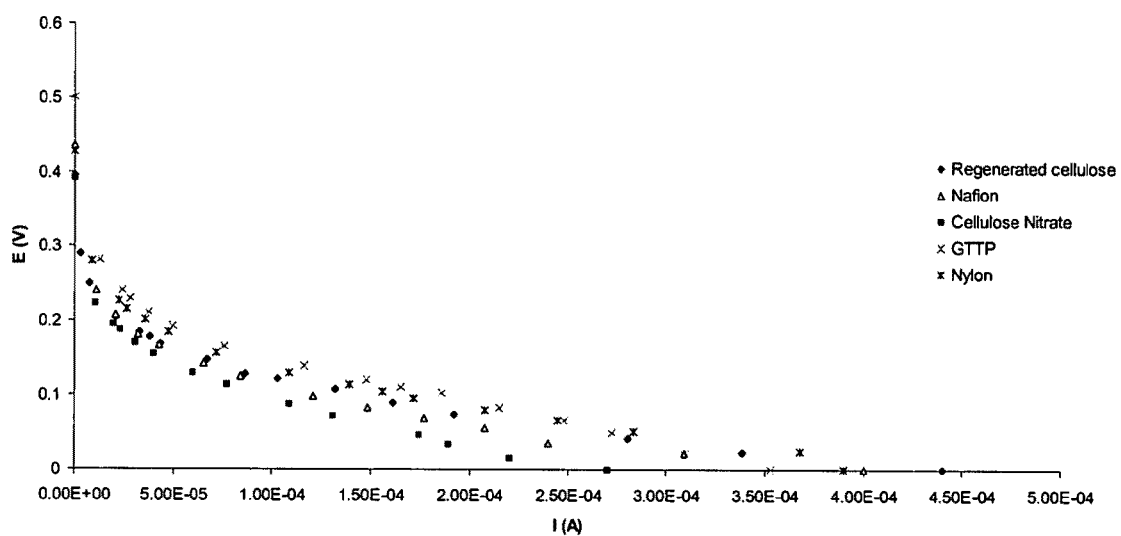
FIG. 8 Current vs. Voltage profile for a Graphite Felt/O$_2$ Cathode in a mini-MFC setup with an Assortment of Nanoporous Membranes.
Figure 9:
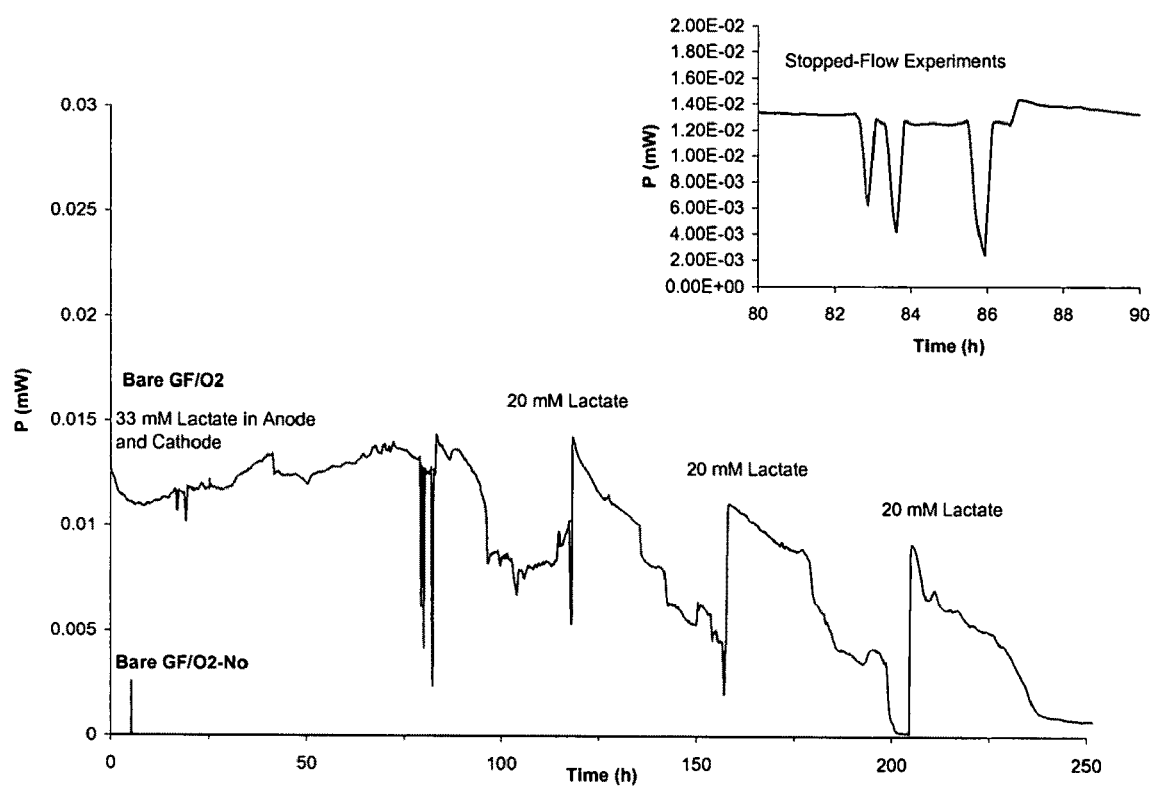
FIG. 9 DSP10 vs. Blank Fuel Cell with Regenerated Cellulose Membrane in a mini-MFC design (Bare GF/Oxygen Cathode).
Figure 10:
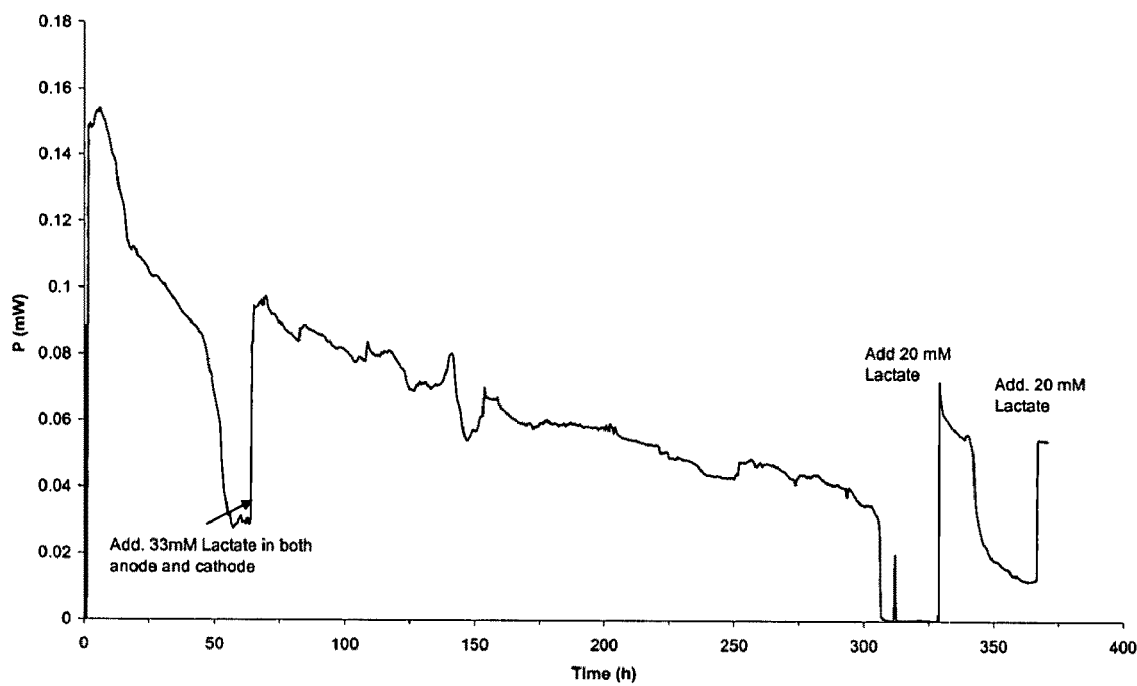
FIG. 10 Mini-MFC with Regenerated Cellulose Membrane and a Pt/C and GF/Oxygen Cathode.
Figure 11:
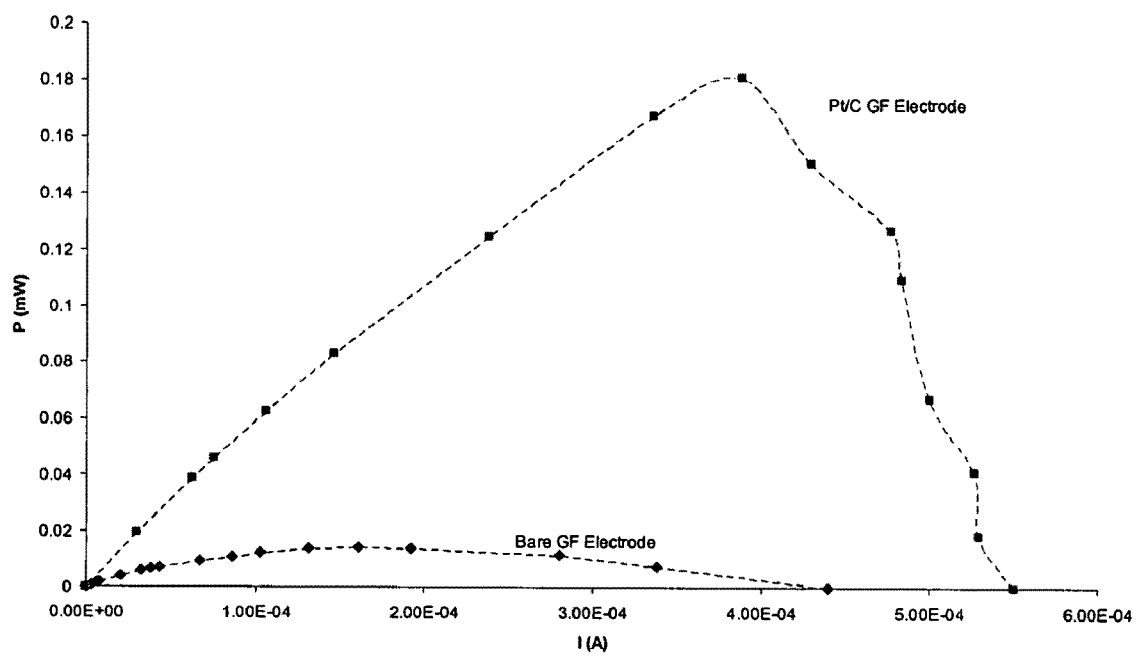
FIG. 11 Power curves from the mini-MFC design with regenerated cellulose membranes with Pt/C on GF electrodes or bare GF cathodes.
Figure 12:
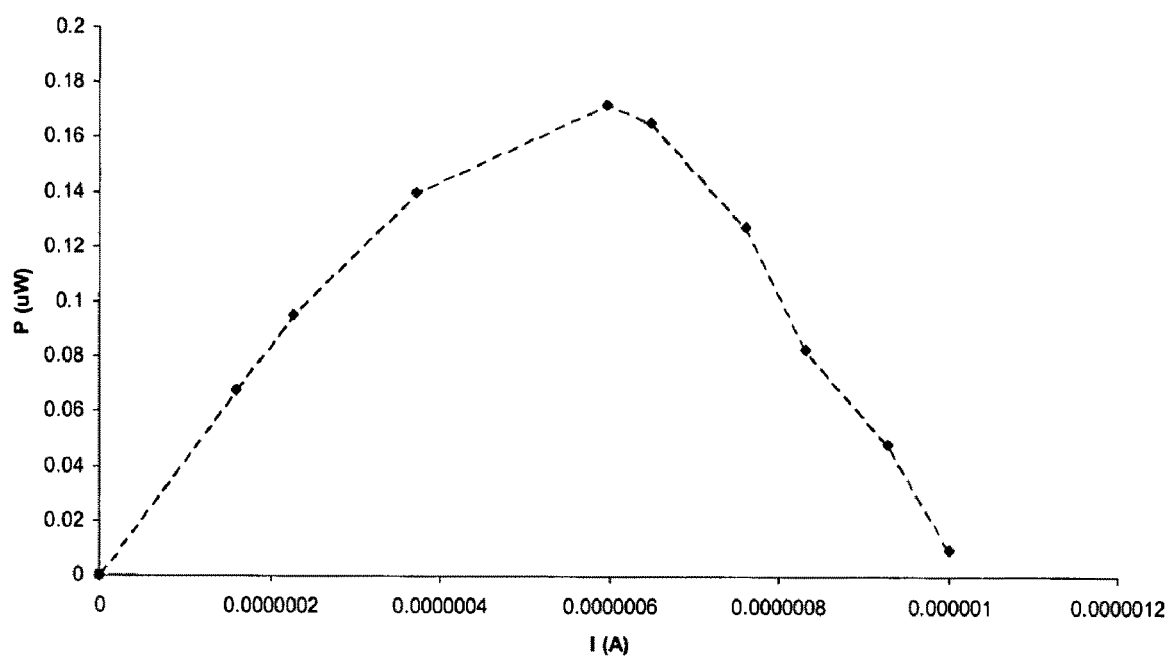
FIG. 12 Power Curve for Microfuel Cell Device (Test Device 3) with an Oxygen Cathode and Regenerated Cellulose Membrane.
Figure 13:
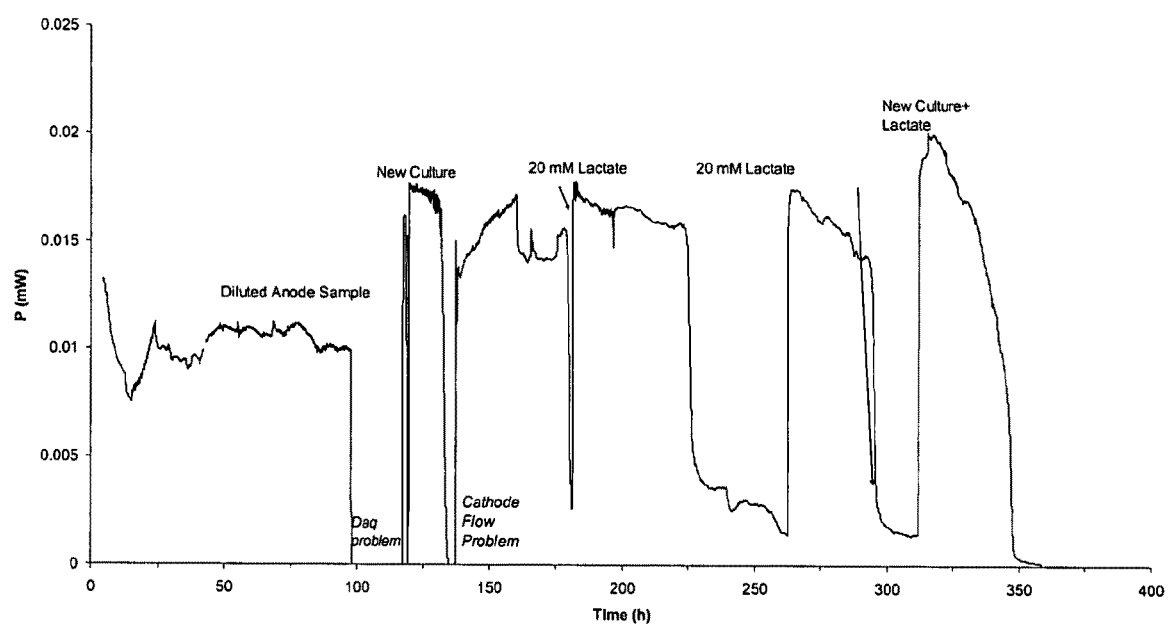
FIG. 13 Fuel cell power output over 300 h. for a mini-MFC design and Three GTTP 0.2 μm membranes and an Oxygen Cathode.
Figure 14:
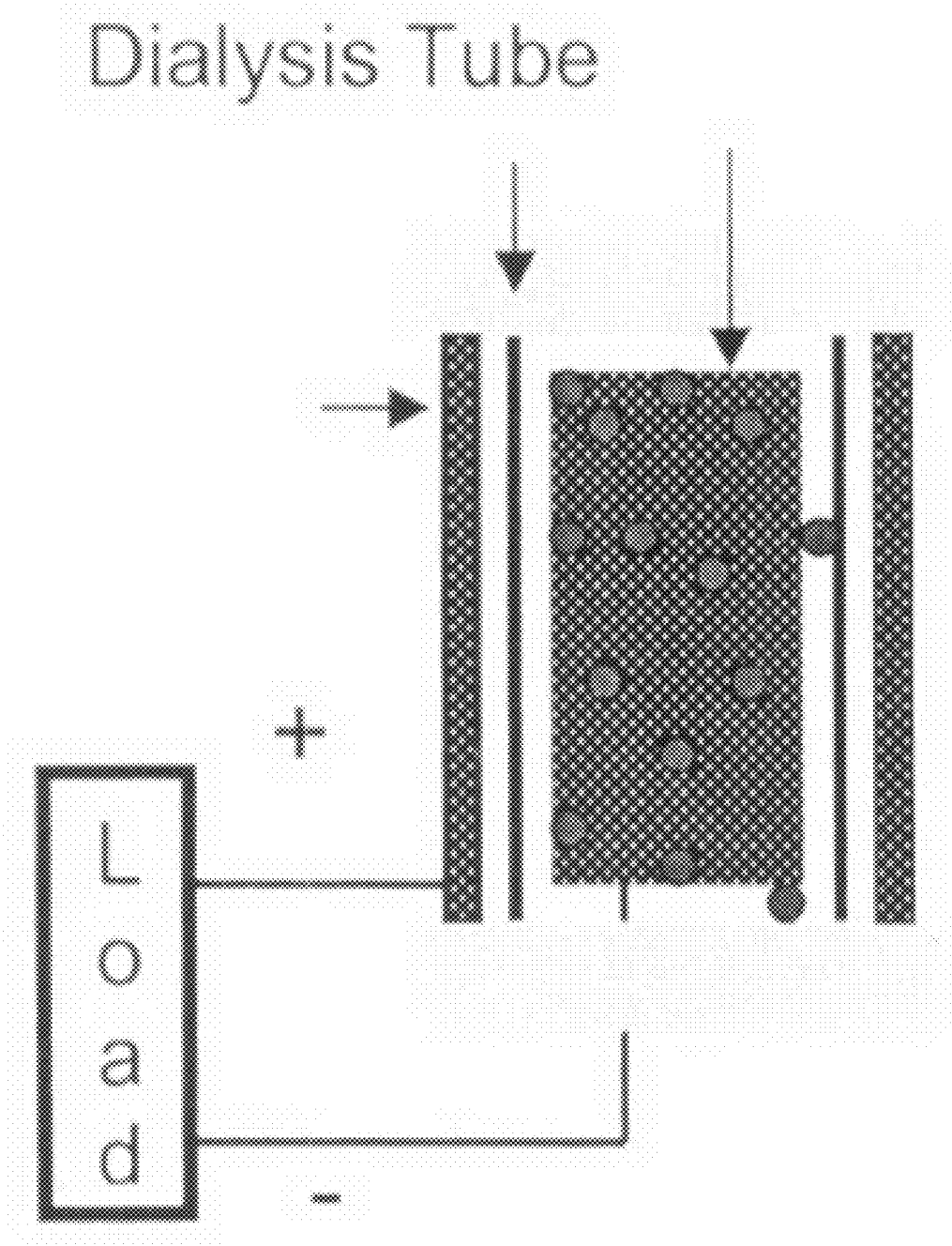
FIG. 14 illustrates an embodiment.
Figure 15:
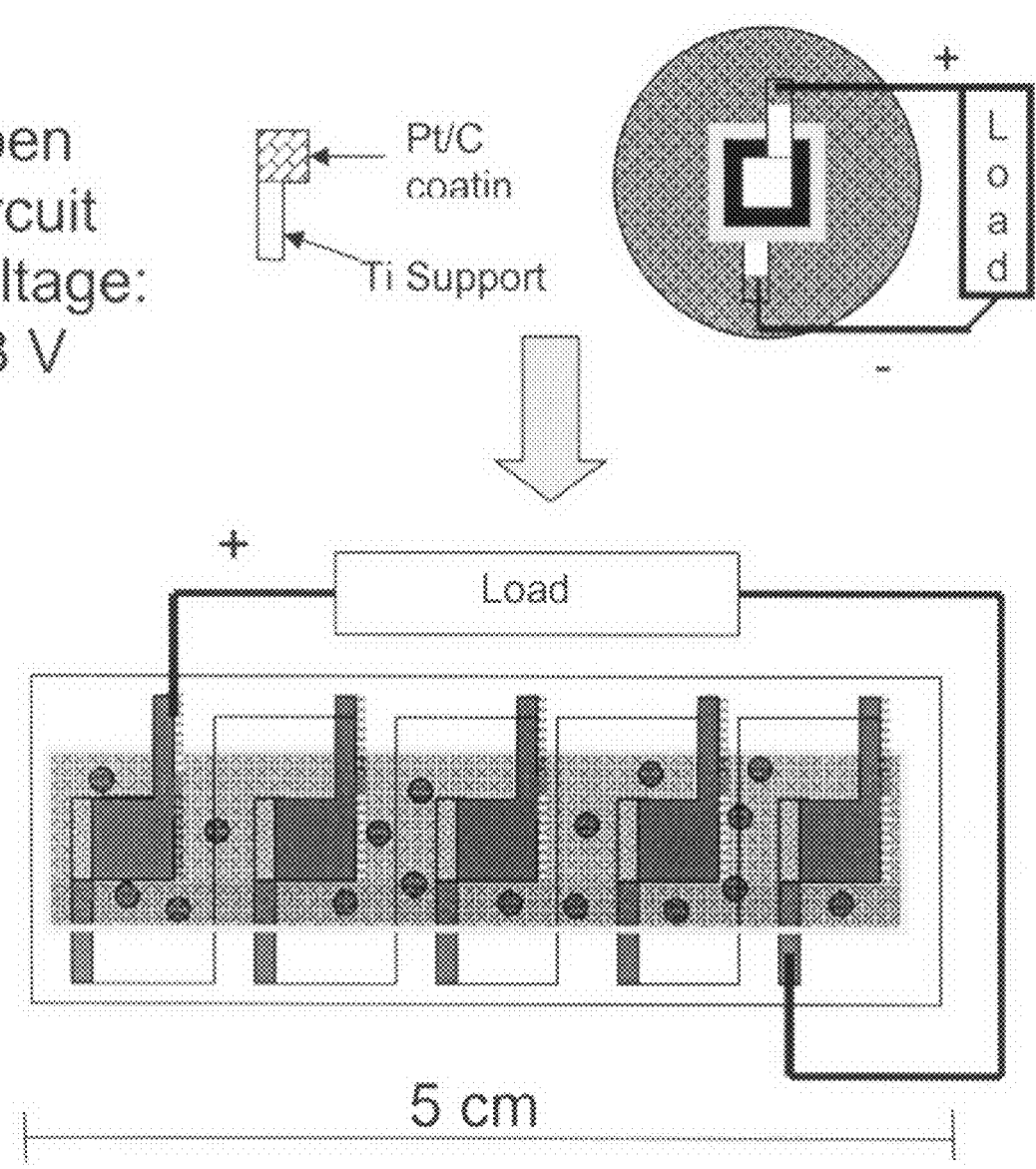
FIG. 15 illustrates an embodiment.
Figure 17:
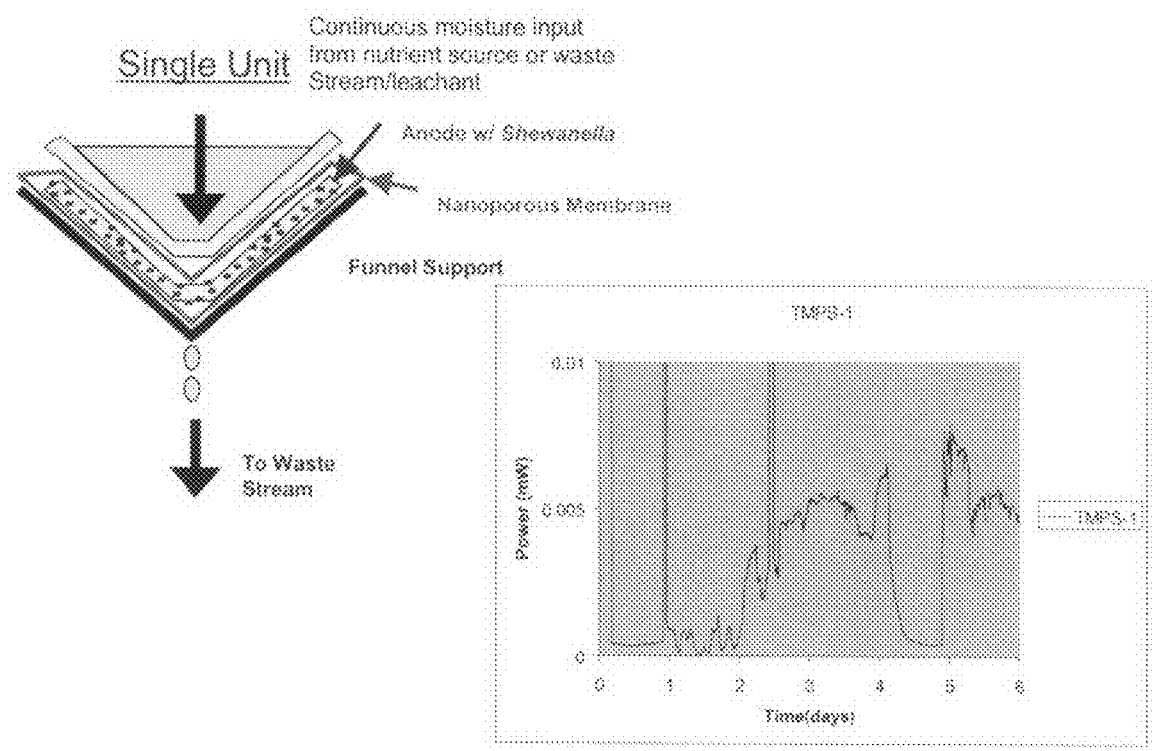
FIG. 17 illustrates an embodiment and a power curve.

An earlier example of a fuel cell used a dialysis membrane, however, this system is not a biological fuel cell by the current definition because it was designed to create concentration gradients through the dialysis membrane between the anode and cathode chambers and that created the electromotive force between the anode and cathode side. There are some known examples of microbial fuel cells using nanoporous membranes. Park and Zeikus used a nanoporous porcelain septum made of Kaolin which was baked to the graphite cathode and replaced a cationic membrane. However this type of septum is thick, expensive to fabricate, and heavy; three qualities that the present invention will not suffer from. They achieved power densities of 788 mW/m$^2$ using *E. Coli* K12 to generate hydrogen for the anodic reaction. Another single chamber fuel cell was developed by Logan which removed the membrane entirely by replacing the carbon cloth electrode with carbon paper which reduced the diffusion of gas and electrolyte from the fuel cell chamber. This system does not separate the anode and cathode chambers making the bacteria to be just as likely to attach to the cathode as the anode and since the carbon paper is not nanoporous the bacteria will diffuse out of the chamber over time. Microporous membranes have been mentioned in a recent patent by Heller for enzymatic fuel cells. However, the membranes had larger pore sizes (>1 μm) and were only being used as separators between the electrode chambers in enzymatic fuel cells and not used in the same fashion as described in this application. In the present application the membranes are used for microbial fuel cells where the microbe itself needs to be sequestered. Furthermore, the passive flow of nutrients through the membrane occurs. Furthermore still, the proposed microstructure (FIG. 4) and inverted cathode design are possible with the current membranes due to their unique characteristics.

EXAMPLE 1

Useful power generation can be obtained from a miniaturized MFC device in aquatic environments at the air/water interface using nanoporous membranes. A picture of half of one of the test devices for different membranes is shown in FIG. 1. It consists of a 1.2 mL electrode chamber that is sealed with rubber O-rings and screws passed through the membrane. The electrode material composed of graphite felt (GF) or reticulated vitreous carbon (RVC) is placed in the chamber and connected with a titanium wire. The anode was connected to a culture of *Shewanella oneidensis* DSP10 in Luria-Bertani broth and was periodically stimulated with sodium lactate to concentrations of 20-30 mM. The cathode reaction was the reduction of oxygen using 100 mM phosphate buffer (pH 7.2) on the unmodified or platinum modified GF electrode. If the cathode was a modified platinum electrode, they were fabricated by coating the GF electrode with a solution of 60% water, 35% isopropanol, 5% of a 5% nafion solution (binder), and 10 mg of a 20% platinum particles with vulcanized carbon.

EXAMPLE 2

A prototype constructed in a mini-MFC (U.S. Ser. No. 11/308,216, FIG. 1) apparatus (total volume of fuel cell<3 mL) with bare graphite felt electrodes and *Shewanella oneidensis* DSP10, Luria-Bertani (LB) broth, as the bacteria and a flow oxygen cathode. A regenerated cellulose membrane (Fisherbrand, MWCO 12000-14000 Daltons pore size). Achieved 14 μW, 90 mV (across 560Ω), and 161 μA.

EXAMPLE 3

A bacterial loop was used to collect the contents inside the anode chamber of the initial dialysis tube fuel cell which was disassembled, FIG. 1. After the growth of the bacteria on LB Agar at 25° C. for three days, the plate showed that the bacteria inside the dialysis tube was 100× *Shewanella oneidensis* DSP10 concentration to the unidentified bacteria present which most likely introduced during the collection of the sample with the loop.

EXAMPLE 4

A third prototype constructed in a mini-MFC apparatus (total volume of fuel cell<3 mL) with bare graphite felt electrodes, LB, and 30 mM lactate solution analyte with a flow oxygen cathode. Membrane was a regenerated cellulose membrane (Fisherbrand, MWCO 12000-14000 Daltons) placed in between the two chambers. Measured <0.6 mV across a 2200 ohm resistor.

EXAMPLE 5

A fourth prototype constructed in a mini-MFC apparatus (total volume of fuel cell <3 mL) with bare graphite felt electrodes, LB, 30 mM lactate solution, and *Shewanella oneidensis* DSP10 analyte with a flow oxygen cathode. Membrane was a 0.2 μm cellulose nitrate sterilization filter (Millipore) placed in between the two chambers. Achieved 9.7 μW, 89 mV (across 820Ω), and 109 μA with this fourth prototype.

EXAMPLE 6

A fifth prototype constructed from a regenerated cellulose dialysis tube (Fisherbrand, 12000-14000 Dalton pore size) with LB, 20 mM lactate, placed inside the tube with 0.4 g bare graphite felt electrode placed inside wrapped with a titanium wire. The outside was wrapped with 1.1 g bare graphite felt attached with titanium wire. The whole apparatus with placed in a 100 mM phosphate buffer (pH 7.2) and 30 mM lactate. The system had air continuously bubbled through the jar where the device was housed. The whole system was placed in a 25° C. water bath and the voltage was collected. There was no observable current collected from this device.

EXAMPLE 7

A sixth prototype was constructed in a mini-MFC apparatus (total volume of fuel cell<3 mL) with bare graphite felt electrodes, LB, and a 30 mM lactate solution with a flow oxygen cathode. Membrane was composed of three polycarbonate membranes (Millipore, 0.2 μm pore size) placed in between the two chambers. Recorded 18 μW, 121 mV (across 820 Ωl), and 148 μA with this sixth prototype.

EXAMPLE 8

A seventh prototype was constructed in a mini-MFC apparatus (total volume of fuel cell<3 mL) with bare graphite felt anode, LB, and a 30 mM lactate solution. The cathode was fabricated with a 20% platinum on vulcanized carbon coating (5% nafion used as a binder) on graphite felt with a flow oxygen cathode. Membrane was composed of a regenerated cellulose membrane (Fisherbrand, MWCO 12000-14000 Daltons pore size) placed in between the two chambers. Recorded 181 μW, 466 mV (across 1200Ω), and 388 μA with this seventh prototype.

EXAMPLE 9

An eighth prototype was constructed in a mini-MFC apparatus (total volume of fuel cell<3 mL) with bare graphite felt electrodes (0.13 g each) and a LB, 30 mM lactate solution with DSP10 analyte with a flow oxygen cathode. Membrane was composed of Nylon (Whatman, 0.2 μm pore size) placed in between the two chambers. Recorded 17 μW, 81 mV (across 390Ω), and 208 μA with this eighth prototype.

EXAMPLE 10

A ninth prototype is depicted in FIG. 4a. The titanium foil (5 mm×5 mm) supports had 10 μL of a vulcanized carbon solution (with 10-20% Pt nanoparticles plus 5% Nafion binding solution) which was allowed to air dry overnight. The system used a regenerated cellulose membrane (Fisherbrand, 12000-14000 Dalton) to separate the anode and cathode electrodes. DSP10 was sealed into the anode chamber with the cellulose membrane and 5 minute epoxy (Devcon). The two electrodes were connected with titanium wires and were covered with a 30 mM Lactate solution in 100 mM phosphate buffer (pH 7.2). Recorded 172 nW, 318 mV (across 0.58 MΩ), and 542 nA with this ninth prototype. This device produced this power over three days with the limitation placed on the oxygen content in the cathode chamber and not the degradation of the membrane.

The above description is that of a preferred embodiment of the invention. Various modifications and variations are possible in light of the above teachings. It is therefore to be understood that, within the scope of the appended claims, the invention may be practiced otherwise than as specifically described. Any reference to claim elements in the singular, e.g., using the articles "a," "an," "the," or "said" is not construed as limiting the element to the singular.

What is claimed is:
1. A fuel cell comprising:
   an anode chamber, a cathode chamber, and a nanoporous membrane having a pore size from about 100 nm to about 1000 nm between the anode chamber and the cathode chamber, wherein the nanoporous membrane sequesters a microbe in the anode chamber and wherein the nanoporous membrane allows nutrients to flow from the cathode chamber to the anode chamber.
2. The fuel cell of claim 1 wherein the nanoporous membrane is selected from the group consisting of nylon, polycarbonate, regenerative cellulose, poly(ether sulfone), polysulfone, poly(vinyl pyrrolidone), polyvinylidene fluoride, and cellulose ester.

3. The fuel cell of claim 2 wherein the nanoporous membrane is modified by a thin film composite (TFC) and the resulting membrane functions as a TFC nanofiltration membrane.

4. The fuel cell of claim 2 wherein the nanoporous membrane protects the cathode from biofouling by sequestering the metal reducing microbes at the anode.

5. The fuel cell of claim 2 wherein the electrode material is composed of one selected from the group consisting of carbon paper, graphite felt, carbon microparticles, carbon nanoparticles, and reticulated vitreous carbon in the chamber and connected with a titanium wire.

6. The fuel cell of claim 1 wherein the anode chamber is an anaerobic anode chamber with about 0.1 ml to about 2000 ml of a solution of bacteria and a conductive anode with either enzymes attached or microbial biofilm formation.

7. The fuel cell of claim 6 wherein the cathode chamber is oxygen rich with a conductive cathode and a catalyst that promotes reduction reactions.

8. The fuel cell of claim 1 wherein the anode is connected to a culture of bacteria capable of externalizing electrons through their membranes and periodically stimulated with nutrients.

9. The fuel cell of claim 8 wherein said culture is one selected from the group consisting of Shewanella species, Geobacter species, and microbial consortia conditioned to generate electricity.

10. The fuel cell of claim 1 wherein a reaction at the cathode is the reduction of oxygen using 100 mM phosphate buffer with a pH of 7.2 on an unmodified or modified carbon electrode.

11. The fuel cell of claim 10 wherein the modified carbon cathode is fabricated by coating the electrode with a solution of 60% water, 35% isopropanol, 5% of a 5% nafion solution, and 10 mg of a 20% platinum particles with vulcanized carbon.

12. A method of making a fuel cell comprising:
configuring a nanoporous membrane having a pore size from about 100 nm to about 1000 nm between an anode chamber and a cathode chamber wherein the nanoporous membrane sequesters a microbe in the anode chamber wherein the nanoporous membrane allows nutrients to flow from the cathode chamber to the anode chamber.

13. The method claim 12 wherein the nanoporous membrane is selected from the group consisting of nylon, polycarbonate, regenerative cellulose, poly(ether sulfone), polysulfone, poly(vinyl pyrrolidone), polyvinylidene fluoride, and cellulose ester and wherein the nanoporous membrane is modified by a thin film composite (TFC) and the resulting membrane functions as a TFC nanofiltration membrane.

14. The method of claim 13 wherein the anode chamber is an anaerobic anode chamber with about 0.1 ml to about 2000 ml of a solution of bacteria and a conductive anode with either enzymes attached or microbial biofilm formation and wherein the cathode chamber is oxygen rich with a conductive cathode and a catalyst that promotes reduction reactions.

15. The method of claim 14 wherein the electrode chamber is about 1.2 mL and wherein the electrode material is composed of one selected from the group consisting of graphite felt, carbon paper, graphite paper, graphite brush and reticulated vitreous carbon in the chamber and connected with a titanium wire.

16. The method of claim 13 wherein the anode is connected to a culture of bacteria capable of externalizing electrons through their membranes and periodically stimulated with nutrients.

17. A fuel cell comprising:
an anode chamber, a cathode chamber, and a nanoporous membrane having a pore size from about 100 nm to about 1000 nm between the anode chamber and the cathode chamber, wherein the nanoporous membrane sequesters a microbe in the anode chamber and isolates from environmental or non-electron producing contaminants and wherein the membrane allows for diffusion of nutrients and waste through the membrane passively or without being pumped.

18. The fuel cell of claim 17 wherein the nanoporous membrane is selected from the group consisting of nylon, polycarbonate, regenerative cellulose, poly(ether sulfone), polysulfone, poly(vinyl pyrrolidone), polyvinylidene fluoride, and cellulose ester and wherein the nanoporous membrane is modified by a thin film composite (TFC) and the resulting membrane functions as a TFC nanofiltration membrane and wherein the electrode material is composed of one selected from the group consisting of carbon paper, graphite felt, carbon microparticles, carbon nanoparticles, and reticulated vitreous carbon in the chamber and connected with a titanium wire and wherein the anode is connected to a culture of bacteria capable of externalizing electrons through their membranes and periodically stimulated with nutrients and wherein said volume of said anode chamber and said cathode chamber are minimized to only the volume needed by covering said anode and cathode respectively.

* * * * *